(12) United States Patent
Farkas et al.

(10) Patent No.: US 8,014,320 B2
(45) Date of Patent: Sep. 6, 2011

(54) METHOD FOR DISCOVERING THE PHYSICAL TOPOLOGY OF A TELECOMMUNICATIONS NETWORK

(75) Inventors: János Farkas, Kecskemét (HU); Vinicius Garcia de Oliveira, Campinas-SP (BR); Marcos Rogério Salvador, Americana-SP (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 272 days.

(21) Appl. No.: 12/519,792

(22) PCT Filed: Oct. 9, 2007

(86) PCT No.: PCT/SE2007/050723
§ 371 (c)(1),
(2), (4) Date: Jun. 18, 2009

(87) PCT Pub. No.: WO2008/076052
PCT Pub. Date: Jun. 26, 2008

(65) Prior Publication Data
US 2010/0020722 A1    Jan. 28, 2010

Related U.S. Application Data

(60) Provisional application No. 60/870,890, filed on Dec. 20, 2006.

(51) Int. Cl.
*H04L 12/44* (2006.01)

(52) U.S. Cl. .......... 370/256; 370/401; 709/221
(58) Field of Classification Search .............. None
See application file for complete search history.

(56) References Cited

U.S. PATENT DOCUMENTS

| | | | |
|---|---|---|---|
| 5,138,615 A * | 8/1992 | Lamport et al. | 370/400 |
| 5,734,824 A * | 3/1998 | Choi | 709/224 |
| 7,356,578 B1 * | 4/2008 | Eatough | 709/223 |
| 7,729,296 B1 * | 6/2010 | Choudhary | 370/256 |
| 7,760,668 B1 * | 7/2010 | Zinjuvadia | 370/256 |
| 2007/0115967 A1 * | 5/2007 | Vandenberghe et al. | 370/389 |
| 2009/0003313 A1 * | 1/2009 | Busch et al. | 370/352 |

* cited by examiner

*Primary Examiner* — Hassan Phillips
*Assistant Examiner* — Duc Duong (57) ABSTRACT

A method and arrangement for discovering the physical topology of a telecommunication network having switches, routers, and a management node interconnected by links in a spanning tree and links to blocked interfaces. The management node broadcasts a ping message and adds replying nodes to the topology. The management node discovers the spanning tree by retrieving address forwarding tables from the switches, assigning them a ranking value, and connecting from the highest ranked nodes to successively lower ranked nodes. The management node discovers the blocked interfaces by configuring a VLAN to include the spanning tree and disabling the spanning tree protocol. The blocked interfaces are turned on and off while matching link down traps are noted and the corresponding links are discovered. Only basic management features of the switches are needed, and all nodes and links are discovered.

14 Claims, 9 Drawing Sheets

METHOD FOR DISCOVERING THE PHYSICAL TOPOLOGY OF A TELECOMMUNICATIONS NETWORK

This application claims the benefit of U.S. Provisional Application No. 60/870,890 filed Dec. 20, 2006, the disclosure of which is fully incorporated herein by reference.

TECHNICAL FIELD

The present invention refers to discovering physical topology of an Ethernet network.

BACKGROUND

Topology discovery is a critical issue in order to have a well managed Ethernet network. There are some approaches in the literature that aim to solve this task, nonetheless, each of them has significant disadvantages.

Link Layer Discovery Protocol (LLDP), described in IEEE 802.1AB—Station and Media Access Control Connectivity Discovery, which is the emerging IEEE standard 802.1AB, promises to simplify troubleshooting of enterprise networks and enhance the ability of network management tools to discover and maintain network topologies. The protocol LLDP is a neighbor discovery protocol. It defines a standard method for Ethernet network switches to advertise information about themselves to neighbor nodes on the network and store the information that they discover. They store the LLDP information in an IEEE-defined Simple Network Management Protocol (SNMP) Management Information Base (MIB), thus it is available to network management systems. Nevertheless, LLDP proposes a standard topology discovery approach, LLDP may/will not be implemented in all Ethernet switches, especially not in low-cost products.

A serious drawback of the protocol LLDP is that it is not available in low-cost Ethernet switches. Therefore an operator having some switches that do not support LLDP cannot have topology discovery based on this protocol. This is true especially when each switch is a low-cost node without LLDP in order to have a low-cost network. Authors of R. Black, A. Donnelly and C. Fourne, "Ethernet Topology Discovery without Network Assistance," 12th IEEE International Conference on Network Protocols (ICNP'04), 2004, pp. 328-339, propose an Ethernet (Layer 2) topology discovery scheme without assistance from the network elements but relying on the hosts connected to the network. Most hosts in the network run a daemon that injects suitable probe packets and observe where they are delivered. Therefore, network hosts require new functionality, which does not fit into a low-cost approach.

The most significant drawback of this is that each host has to run a daemon in order to achieve topology discovery, which is hard to accomplish in an Ethernet network, especially in a low-cost one. Further problem of probe packet based approaches is that they can only discover the forwarding topology but not the physical topology. That is physical links that are actually not used for packet forwarding, e.g. blocked by STP, cannot be discovered in a probe packet manner.

Another approach is proposed in M-H. Son, B-S. Joo, B-C Kim and J-Y Lee, "Physical Topology Discovery for Metro Ethernet Networks," ETRI Journal, vol. 27, no. 4, August 2005, pp. 355-366. This approach is based on monitoring of Spanning Tree Protocol (STP) messages, i.e. Bridge Protocol Data Units (BPDU) and retrieving STP MIBs from the switches.

The above approach proposed by M-H. Son et al cannot be applied in a network where STP is disabled for some reason, e.g. TRILL or it is assured by VLAN design that the topology is loop free. Furthermore, the assumptions used therein are not valid for all switches, i.e. it is vendor dependent.

In B. Lowekamp, D. R. O'Hallaron and T. R. Gross, "Topology Discovery for Large Ethernet Networks," ACM SIGCOMM 2001, San Diego, Calif., USA, August 2001, pp. 237-248, and in Y. Bejerano, Y. Breitbart, M. Garofalakis and R. Rastogi, "Physical Topology Discovery for Large Multi-Subnet Networks, "IEEE INFOCOM 2003, San Francisco, USA, April 2003, pp. 342-352, Address Forwarding Table (AFT) information is collected via SNMP MIBs to discover the topology, but only spanning tree paths can be retrieved.

A common feature of those works described in the two above publications is that they only use AFT entries. So, they can only find spanning tree paths and exclude multiple redundant paths. Even though their techniques are said to discover the physical topology of Ethernet networks, they have the limitations of discovering only Layer-2 spanning tree paths.

To summarize: existing solutions, that do not use LLDP and are claimed to discover the physical topology, only discover the forwarding topology determined by STP or in some cases able to find links that are blocked by STP but they do not discover all physical links in a heterogeneous Ethernet network.

SUMMARY

The present invention is concerned with a problem to discover the physical topology of an Ethernet network. The discovery has to cover all the network nodes and links, also links that are blocked by a spanning tree protocol xSTP. The discovering also has to be independent of the type of network nodes.

A further problem is to discover changes in the network topology during its operation.

The problems of discovering the physical topology of an Ethernet network are solved in the following manner. The network has nodes, including switches, bridges and routers, interconnected by physical links, and a management node with a network management system. The nodes have interfaces on witch a spanning tree protocol xSTP is enabled to set up a spanning tree topology. The switches, bridges and routers are configured with an IP address of the management node. The management node broadcasts a node discovery message and on receiving a reply message from one of the nodes it adds that node to the network physical topology. The tree topology of the physical links is set up with the aid of the XSTP, wherein the management node both retrieves information from Address Forwarding Tables AFT maintained by the switches and assigns a ranking value to each of the switches. The ranking value depends on how many of the switches that are seen by each switch and with the aid of which the physical links are discovered.

The assigning of the ranking value to one of the switches optionally includes that the total number of nodes in the network seen by the switch is established. A number of the nodes, seen via the interface that contains the MAC address to the management node, are then excluded from the total number giving the ranking value.

The tree topology is optionally discovered by determining the ranking value of a first one of the switches and determining a second one of the switches with the next lower ranking value. The interface of the first switch, on which the second switch is received, and the interface of the second switch, which leads to the network management system node, are interconnected with a link.

A blocked interface is optionally discovered by configuring a VLAN to include only the tree topology obtained by the xSTP and the xSTP is then disabled. It is determined that the blocked interface is up and is not connected to the reconfigured VLAN. The blocked interface is turned off and on and matching link down traps from each end of a link are noted. The blocked interface is connected to its link peer interface.

Changes in the tree topology of the physical links are optionally discovered by seeking cyclically for the status of the interfaces of the switches. An added link is discovered by detecting the matching link peer interface to one of the interfaces of the switch, the detecting being performed by two corresponding link down traps. The newly found status is compared with the previous status and a discovered link is added to the network topology.

The status of the interfaces of one of the switches is optionally checked and it is unable to detect two corresponding link down and up traps for one of the interfaces. The interface is added to the network and the topology discovery to discover the structure of a network segment connected via said one interface is repeated.

An object of the invention is to discover the physical topology of an Ethernet network, covering all the network nodes and links, also links that are blocked by any of the spanning tree protocols, e.g. STP, RSTP or MSTP, and to be independent of the type of network nodes.

A further object is to discover changes in the network topology during its operation.

The proposed method and arrangement has the advantages to discover the physical topology of heterogeneous Ethernet networks independently of vendors and without enhanced features of the switches. It works on commodity off-the-shelf switches, only basic management features are required. The mechanism does not require any specific protocol running on network nodes and works with equipment from various vendors. Each node and physical link of the network is discovered, also links to blocked interfaces of the nodes. The physical topology of the network is continuously monitored and the addition or removal of physical connections or network segments is continuously detected. The discovery is robust.

The invention will now be more closely described with the aid of preferred embodiments and with reference to enclosed drawings.

DETAILED DESCRIPTION

Figure 1:
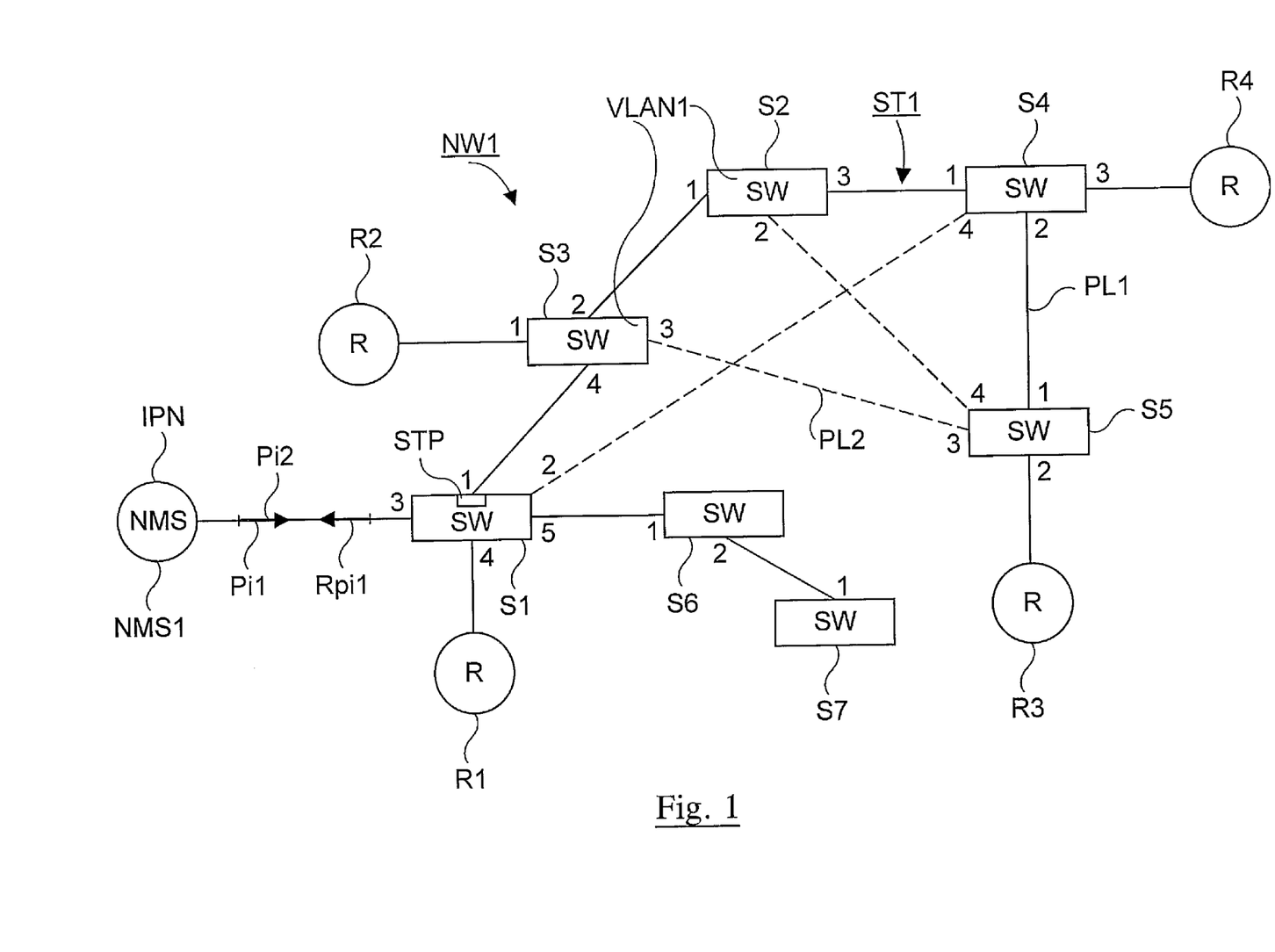
FIG. 1 shows a view over an example network.

FIG. 1 shows as an example a view over a network NW1. The network NW1 has a number of nodes, including switches S1-S7, routers R1-R4 and a management node NMS1 on which the Network Management System NMS is implemented. As an alternative also bridges can be included among the nodes. The nodes are interconnected by physical links, like links PL1 and PL2. As will be described more closely below a presumption is that a spanning tree protocol, denoted xSTP, is running on the network NW1. Examples on the xSTP are the Spanning Tree Protocol STP, the Rapid Spanning Tree Protocol RSTP and the Multiple Spanning Tree Protocol MSTP. The XSTP sets up a spanning tree ST1 marked with bold lines representing the physical links PL1 to active interfaces of the nodes. Dashed lines represent the physical links PL2 to the interfaces which are blocked by the XSTP. Interface numbers 1, 2 . . . are noted for each of the switches S1-S7 at corresponding link end. In an alternative embodiment the switches are included in a virtual LAN VLAN1. The aim for the NMS is to discover and store the physical topology of the network NW1.

Basic Concept of the Topology Discovery

The physical topology discovery is done automatically by the Network Management System NMS at network start-up. Note that the network NW1 then is completely unknown to the system NMS in the management node NMS1 and its database is empty.

Figure 2:
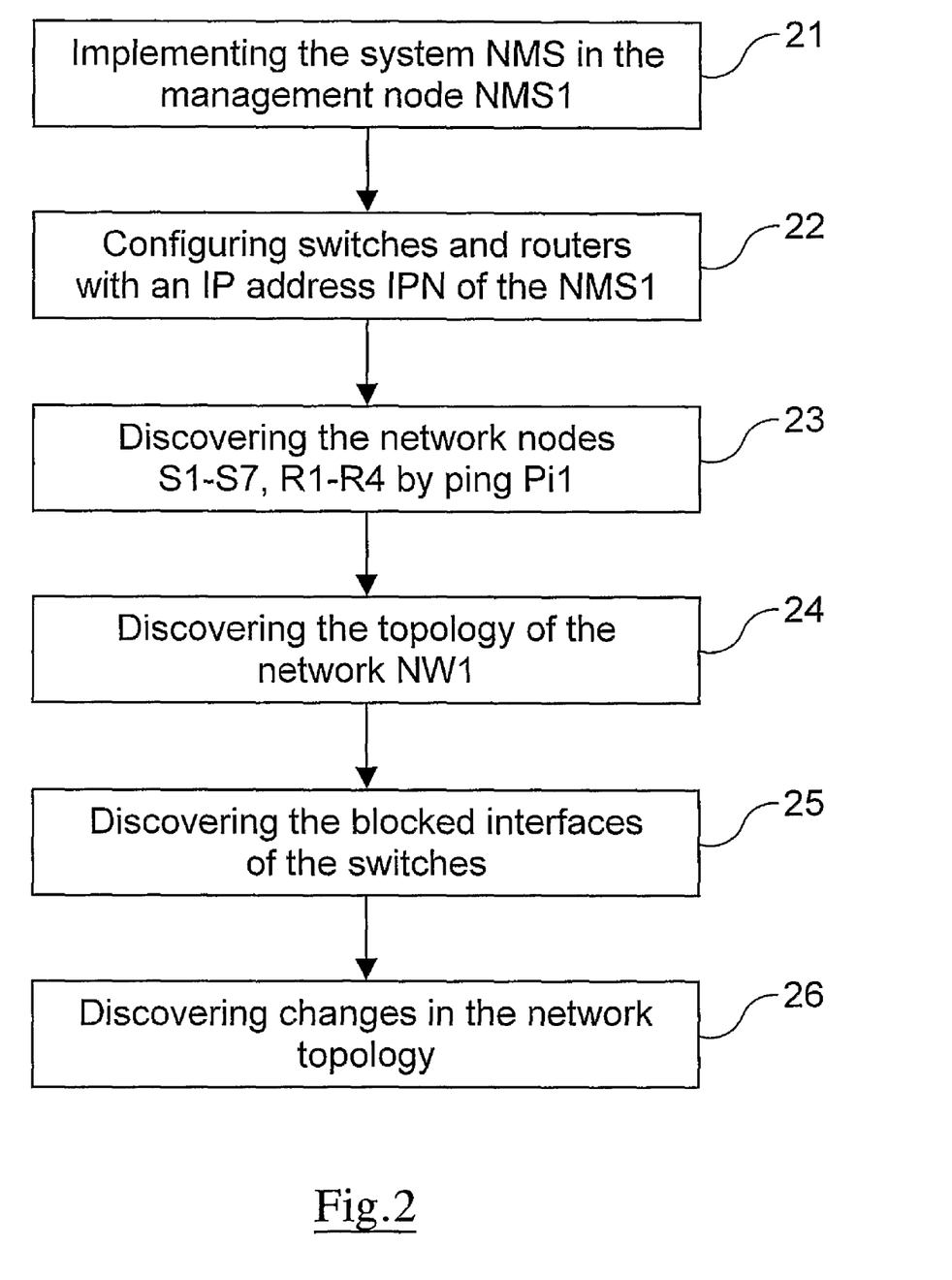
FIG. 2 shows an overview flowchart over the discovery.

FIG. 2 shows a flowchart with an overview over the discovery method. In a step 21 the system NMS is implemented in the management node NMS1. The switches and routers are configured with an IP address IPN of the node NMS1 in a step 22. In a next step 23 the management node NMS1 discovers the network nodes S1-S7 and R1-R4 by a node discovery message Pi1. This message is a so called broadcast ping and in an alternative it is an Address Resolution Protocol ARP message. Then, in a step 24, the physical links PL1 that are part of the spanning tree determined by the protocol xSTP are discovered. In order to have this tree, forwarding tables of the switches S1-S7 are read out in a specific order. Then the physical links PL2 that are blocked by the xSTP are determined with the help of the Simple Network Management Protocol SNMP, step 25. In a step 26 changes in the physical topology of the network NW1 are checked regularly by the system NMS during network operation.

Assumptions for the Embodiment

The topology discovery mechanism, driven by the Network Management System NMS, relies in the embodiment on the following assumptions:

The network handled includes layer 2 (L2) or layer 2/layer 3 (L2/L3) switches in the core and L2/L3 switches or IP routers at the edge.

The switches have the following protocols implemented: 802.1q (Virtual LAN), 802.1d (Spanning Tree Protocol STP or corresponding XSTP protocol) and RFC 1157 (Simple Network Management Protocol).

The switches have the following Management Information Bases (MIBs) implemented: Bridge MIB (RFC 1493) and MIB II (RFC 1213) and IF MIB (RFC 2863).

The switches and the routers (one of the core interfaces of the router) are configured with the same subnet mask. The subnet address is known in advance by the NMS.

The switches and routers are configured with the IP address of the management node NMS1 to be able to send traps to the system NMS.

The switches start in one embodiment with all interfaces included in an untagged virtual LAN (VLAN). In an alternative embodiment the VLAN is enabled later in the discovery process, as will be described below.

The switches start with the spanning tree protocol XSTP enabled on all the interfaces.

The system NMS has one interface directly connected to the L2 network. The topology discovery mechanism will exchange messages with the network elements through this interface.

Proprietary topology discovery protocols are in the embodiment disabled on all the switches but can as an alternative be retained.

It is also an alternative to let the proprietary topology discovery protocols to run.

The method includes two execution times: initialization and on-the-fly. Both of them will be described below.

Initialization Time

When the physical topology discovery process (PTDP) in the NMS initiates, its database is completely empty and the only assumptions are the ones described above. This means that the network is completely unknown to the system NMS in the management node NMS1. During the initialization time the method passes through three well-defined phases: node, spanning tree and blocked interface discovery. During the initialization time it is supposed that no changes occur in the network.

Node Discovery

Figure 3:
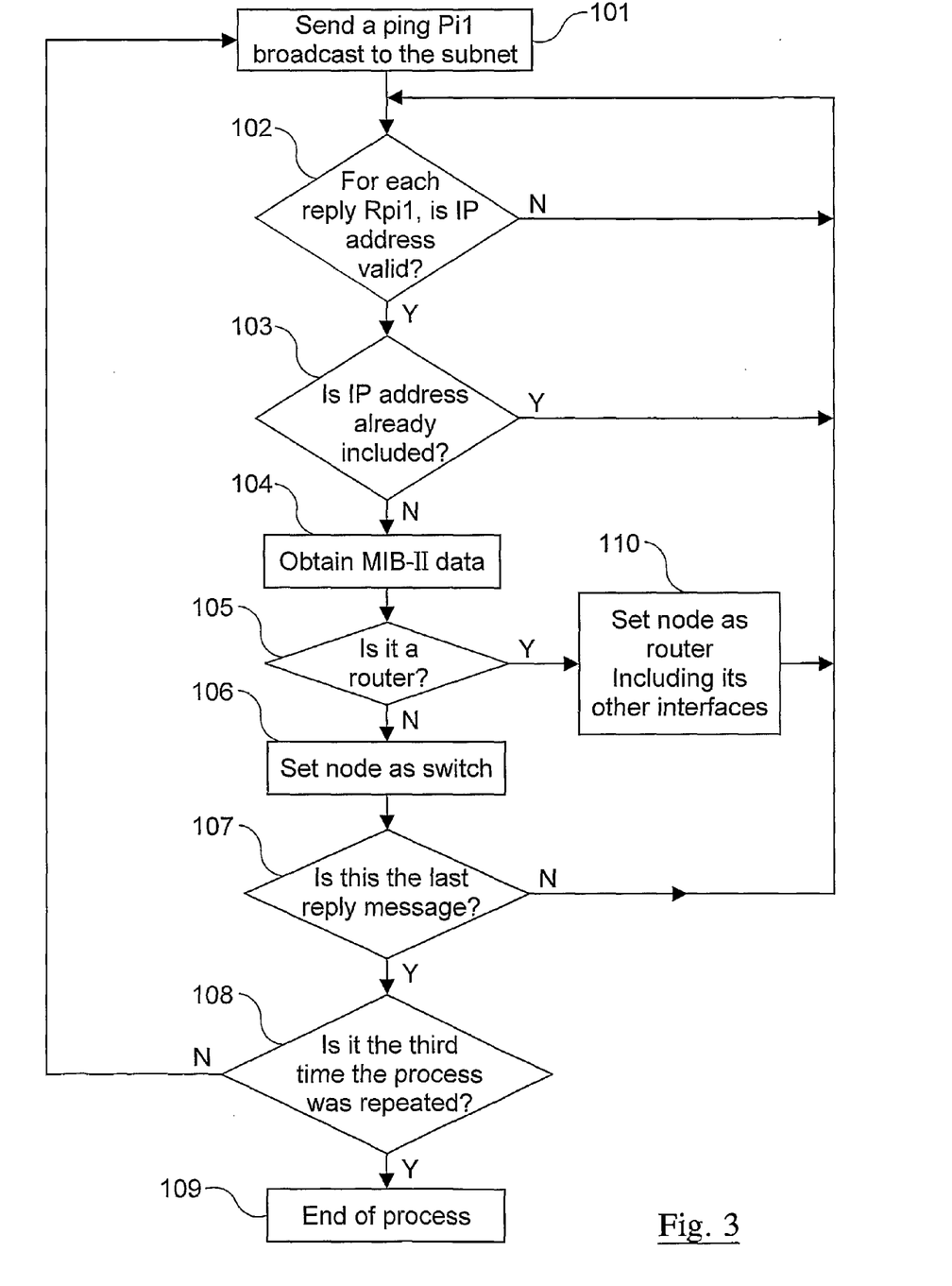
FIG. 3 shows a flowchart over node discovery.

The Physical Topology Discovery Process PTDP starts with discovering the nodes (switches S1-S7 and routers R1-R4) present in the network, exemplified by the network NW1. The PTDP broadcasts the node discovery message, in the embodiment a so called ping message Pi1 with the subnetwork broadcast address and waits for reply messages RPi1. The ping message Pi1 is an Internet command for check of a connection. For each reply RPi1 it adds a new node in the physical topology map. As some replies may be lost, PTDP repeats this phase a number of times, e.g. three times, ignoring the replies already registered. FIG. 3 shows the flowchart that more in detail describes the node discovery method. The method starts with sending broadcast the ping message Pi1 in a block 101. In a block 102 the reply messages RPi1 on the ping messages are received from the nodes and it is investigated for each reply if a received IP address for a node is valid. In a no alternative N, wait for a new reply. In a yes alternative Y it is investigated in a block 103 if the received IP address is already included. In a yes alternative Y, wait for a new reply in block 102. In a no alternative N management information base MIB-II data is obtained in a block 104. In a block 105 it is investigated if the node is a router. In a yes alternative Y the node is set as a router including its other interfaces in a block 110 and the procedure returns to block 102 for a new reply. In a no alternative N the node is set as a switch in a block 106. In a block 107 it is investigated if it is the last reply message that is received. In a no alternative N the procedure returns to block 102 for a new reply. In a yes alternative Y it is investigated in a block 108 if it is the third time the process is repeated. In a no alternative N a new ping message Pi1 is sent in the block 101 and in a yes alternative Y the process is ended in a block 109.

Spanning Tree Discovery

It is important to notice that in the network initialization time the spanning tree protocol xSTP is running. XSTP avoids loops in the Layer2 L2 network, blocking the redundant interfaces and building a loop-free tree topology through the active interfaces.

The next task of the Physical Topology Discovery Process PTDP is to discover the spanning tree ST1 calculated by xSTP. This is the most complex part of the process, and it is accomplished by retrieving information from the Address Forwarding Table AFT maintained by each switch. The AFT stores the Medium Access Control MAC addresses reachable via a given interface. This information is provided by the Bridge MIB (RFC 1493) and is obtained by means of the protocol SNMP get messages by the system NMS.

There are other relevant fields of information in the Bridge MIB that could have been used to discover the blocked interfaces. Nevertheless, those fields are optional and some vendors do not implement them. For this reason, PTDP uses a different approach to discover the blocked interfaces, see description below under Blocked Interfaces Discovery.

During the phase of tree discovery a ranking value RV is assigned to each switch: the number of nodes seen by it, excluding the ones seen via the interface that contains the NMS MAC address in its range. The AFT of each switch was filled-in during the node discovery phase as a result of the broadcast request and its responses. The highest value switch will always be the one directly connect to the management node NMS1, in the example the switch S1. The ranking values for the switches S1-S7 in the network NW1 are noted in each of the switches in Table 1 below.

Table 1 shows the address forwarding table AFT at each of the switches S1-S7 in FIG. 1 after the node discovery phase. For e.g. the switch S1 the figure shows that the switches S2, S3, S4, S5 and the routers R2, R3, R4 are reached via the interface No. 1. The management node NMS1 is reached via interface No. 3, the router R1 via the interface No. 4 and the switches S6 and S7 via the interface No. 5.

TABLE 1

Address Forwarding Tables state

| | Interface | MAC |
|---|---|---|
| $S1_{RV=10}$ | 1 | S2, S3, S4, S5, R2, R3, R4 |
| | 3 | NMS1 |
| | 4 | R1 |
| | 5 | S6, S7 |
| $S3_{RV=6}$ | 1 | R2 |
| | 2 | S2, S4, S5, R3, R4 |
| | 4 | NMS1 |
| $S2_{RV=4}$ | 1 | NMS1 |
| | 3 | S4, S5, R3, R4 |
| $S4_{RV=3}$ | 1 | NMS1 |
| | 2 | S5, R3 |
| | 3 | R4 |
| $S5_{RV=1}$ | 1 | NMS1 |
| | 2 | R3 |
| $S6_{RV=1}$ | 1 | NMS1 |
| | 2 | S7 |
| $S7_{RV=0}$ | 1 | NMS1 |

From the AFT tables the method determines that the switch S1 in FIG. 1 is the switch with the highest ranking value RV=10, as it is the one connected to the network management system NMS1 on interface 3. The switch S1 may achieve many switches and routers on its interface 1, so it is assumed that this interface is connected to the second highest ranking value switch S3 through this switch's interface number 4, which leads to the management node NMS1. Thus, in the picture of the network NW1 to be discovered by the management node NMS1, the interface 1 of the switch S1 is connected by a link to the interface 4 of the switch S3. In a corresponding manner interface 5 of switch S1 is interconnected with interface 1 of switch S6. Interface 4 may achieve just one router. In this case, the interface 4 is connected to the router R1 directly through the router interface whose MAC address matches the one in the AFT. All the switches are handled in a corresponding manner, completing the spanning tree discovery phase.

Figure 4:
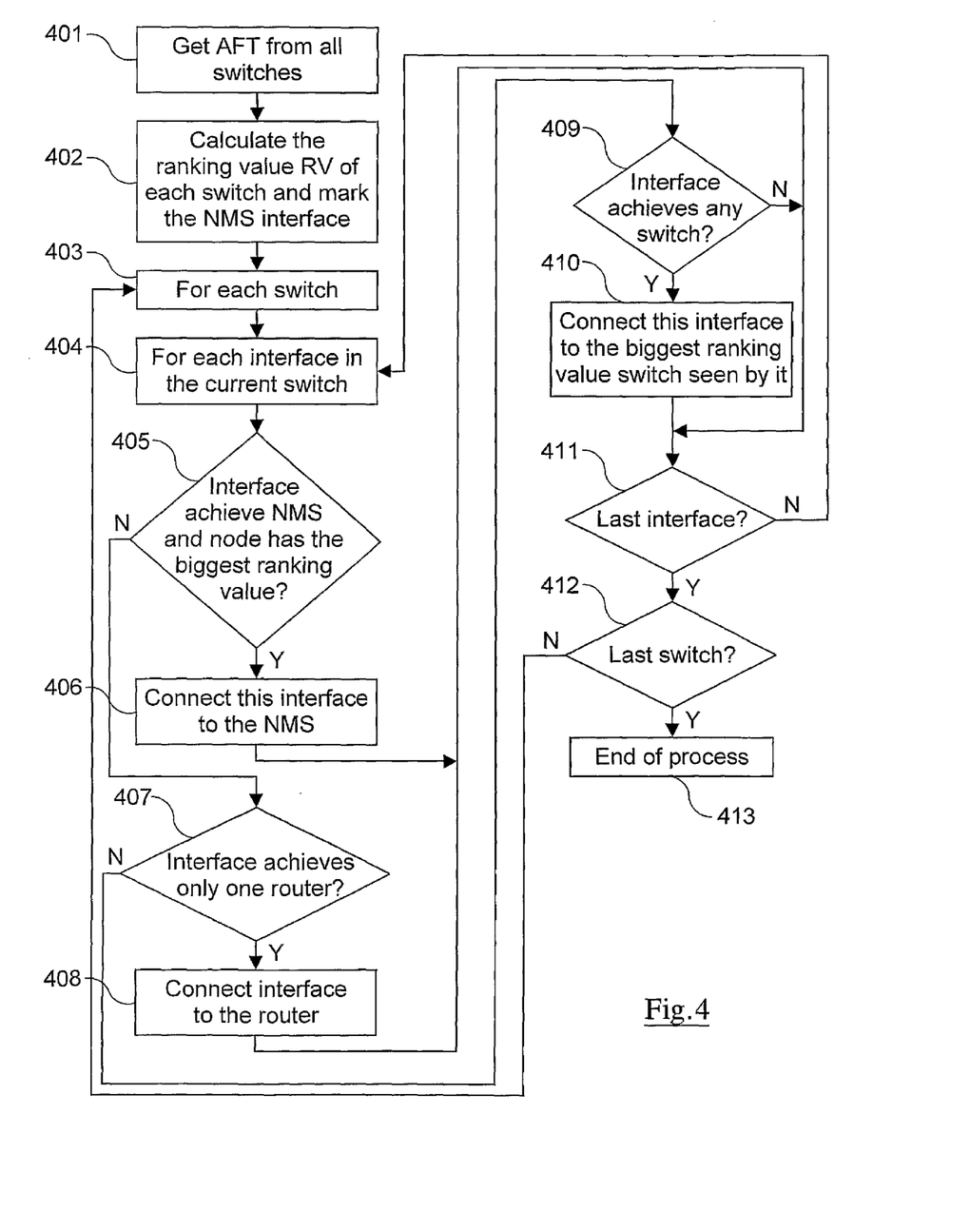
FIG. 4 shows a flowchart over spanning tree discovery.

FIG. 4 presents the spanning tree discovery method flowchart. It shows the above described method more in detail and will be described by an example in connection with the network NW1 in FIG. 1. Note that it is presumed that initially the topology of the network NW1 is unknown to the system NMS in the node NMS1. In a block 401 the AFT:s from all the switches are collected by the management node NMS1. The ranking value of each switch is generated in a block 402 and the interface to the management node NMS1 is marked. As mentioned above the switch S1 has the highest ranking value and the interface 3 connects the network management system NMS. In a block 403 the switch S1 is selected the first time this block is passed and in a block 404 the interface 3 is selected. In a block 405 it is decided if the interface 3 achieves the NMS and if the node has the highest ranking value. This is the case in a yes alternative Y and in a block 406 the interface 3 is connected to the node NMS1 in the tree discovery process. Next step is performed in a block 411 where it is decided if it is the last interface of the current switch S1. This is not the case, only interface 3 is noted in the discovery process. Thus a no alternative N leads back to block 404 for an interface 1 on switch S1. Block 405 now gives a no alternative N leading to a block 407, in which it is decided if the interface achieves only one router. This is not the case and gives a no alternative N leading to a block 409. In this block it is decided if the interface achieves any switch which is the case in a yes alternative Y. In a block 410 the interface 1 is connected to the switch S3 and in the following block 411 the question "Last interface?" gives the no alternative N. The process with the blocks 404, 405, 407 and 409 is repeated for all interfaces of switch S1 towards other switches until the question in block 409 gives a no alternative N leading to block 411. The no alternative N in this block leads to block 404, 405 and 407. Now the question in block 407 gives a yes alternative Y and the interface 4 is connected to the router R1 in a block 408. The process continues with block 411 and a yes alternative Y in this block leads to a block 412 with the question if it is the last switch. A no alternative N leads to the block 403 and the process is repeated as described for next switch of the network. The repetition goes on until the last interface of the last switch gives a yes alternative in the block 412 and the process ends in a block 413.

It is to be noted that the blocked interfaces to the physical links PL2 are not discovered in the above process.

Blocked Interfaces Discovery

As mentioned above the discovery process starts with the spanning tree protocol XSTP enabled on all the switch interfaces. The XSTP generates as described the spanning tree ST1 that is consistent and loop free and therefore some of the switch interfaces can be blocked. An example is the interfaces to the physical links PL2 of the network NW1 in FIG. 1. To complete the initialization phase also these blocked interfaces on the switches have to be discovered.

The discovery of the interfaces blocked by xSTP can be done using some fields in the Bridge MIB, like the "designated bridge". Nevertheless, those fields are optional, and some vendors do not implement them. Because of that, in the present method a different approach is found: use of link down traps.

A link down trap occurs when an interface no longer senses the electrical voltage of its pair through the cable. It usually happens when the link is opened, probably because of a link failure. In such a case, the switch tries to warn the management system of the event.

This link down trap carries useful information for the topology discovery, like the interface ID for the interface that detected the failure and the IP address of the switch that issued the trap. This data is used to discover the remaining interfaces.

To generate the link down trap the discovery mechanism must cause a failure. At the first sight all that the process PTDP has to do is to check which interfaces that are in the UP state and which do not belong to the discovered tree. Then the process has to, for each interface, turn it off and match the information obtained from the two traps that should be received from the switches at both ends of the relevant link.

However, if the spanning tree protocpl XSTP is running some of the interfaces may be blocked during a topology change, which may cause connectivity loss between the management node NMS1 and the other nodes for too long. These transients are extremely hard to deal with and must be avoided.

One possible solution is to make the statically-configured service VLAN VLAN1 match the spanning tree determined by the spanning tree protocol XSTP. Either the VLAN is configured now or is configured earlier and is now reconfigured. Then the protocol xSTP can be disabled, before starting the discovery of the inactive links to the blocked interfaces. Note that the interfaces that are left out of the service VLAN VLAN1 do not forward data traffic, but still generate traps in the event of a failure. The service VLAN is also referred to as Data Communication Network DCN in the present description.

At the end of this phase the spanning tree protocol xSTP may or may not be turned on depending on the type of network. For example, in MANs the spanning tree protocol xSTP may not be suitable, especially when the protective switching is applied and static VLAN topologies are calculated by a traffic engineering algorithm based on the recently discovered physical topology of the network. On the other hand, in an enterprise LAN, the network operator will most likely decide to keep the spanning tree protocol xSTP running. In this case the algorithm includes all ports of all nodes back into the service VLAN and reactivates the spanning tree protocol xSTP. Note that only the interfaces belonging to inactive physical links are turned off, hence not affecting the network connectivity as these links are not part of the spanning tree.

Note that the interfaces that are left out of the VLAN do not forward data traffic, but still generate traps in the event of a failure. This is necessary for the discovery of the blocked interfaces to work.

Figure 5:
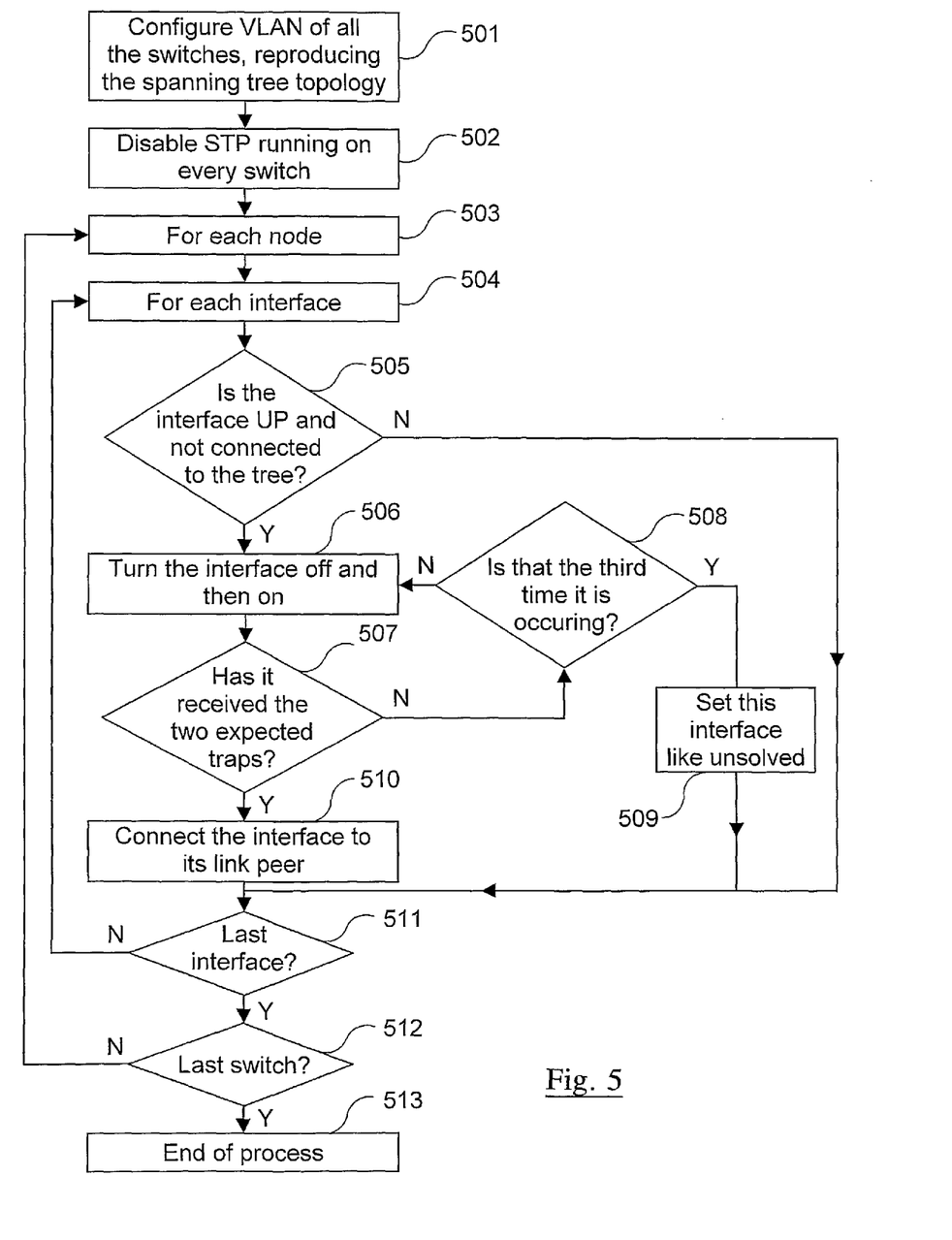
FIG. 5 shows a flowchart over blocked interfaces discovery.

The blocked interfaces are turned off and then on via the protocol SNMP, using some fields in the interface MIB (IF MIB). FIG. 5 shows the flowchart over the method which will be described below.

In a block 501 the VLAN of all the switches is configured, that reproduce the spanning tree topology. In the exemplifying network NW1 the interfaces to the physical links PL2 are excluded from the VLAN. In block 502 the protocol xSTP is disabled on all the switches S1-S7. In blocks 503 and 504 the process successively selects node and interface and then the process begins to investigate the interfaces. In block 505 is investigated if an interface is up and is not connected to the VLAN tree, e.g. the interface 3 on switch S3. In a no alternative N the process continues with a block 511 to see if it is the last interface. In a yes alternative Y the interface is turned off and then on again in block 506. In a block 507 it is investigated if the two expected traps are received and in a yes alternative Y the interface 3 is connected to its link peer in block 510. In a no alternative N in block 507 it is investigated in block 508 if it is the third time the interface is occurring. In a no alternative N the actions in blocks 506 and 507 are repeated. In a yes alternative Y in block 508 the interface is set to unsolved state in block 509. In the block 511 it is investigated if it is the last interface of the switch in question. If not so, a no alternative N, the process is repeated from block 504. For the switch S1 a yes alternative Y is actual, and in a block 512 it is investigated if it is the last switch of the network. For the network NW1 there are still switches to handle and a no alternative N is present. The process is repeated from the block 503 until all the blocked interfaces of all the switches are discovered.

At the end of this phase, the blocked interfaces discovery, the initialization phase of the topology discovery method is ready. This means that the initial physical topology of the network NW1 has been discovered and is stored by the system NMS in the node NMS1.

Changes in the Network, On-The-Fly Time Loop

The on-the-fly time loop is an infinite loop which aims to discover changes in the network during its normal operation. Basically it keeps seeking cyclically for the interfaces status, by the protocol SNMP, and compares it with its previous status, stored in the database of the management node NMS1. Because any modification in the network results in a change of one or more interfaces status, this method covers all possibilities: the addition and removal of a link, a node or a network segment. The system NMS reaches the switches and gets the traps through the Data Communication Network DCN calculated previously, during the above described initialization time.

Adding or Removing a Link

Figure 6:
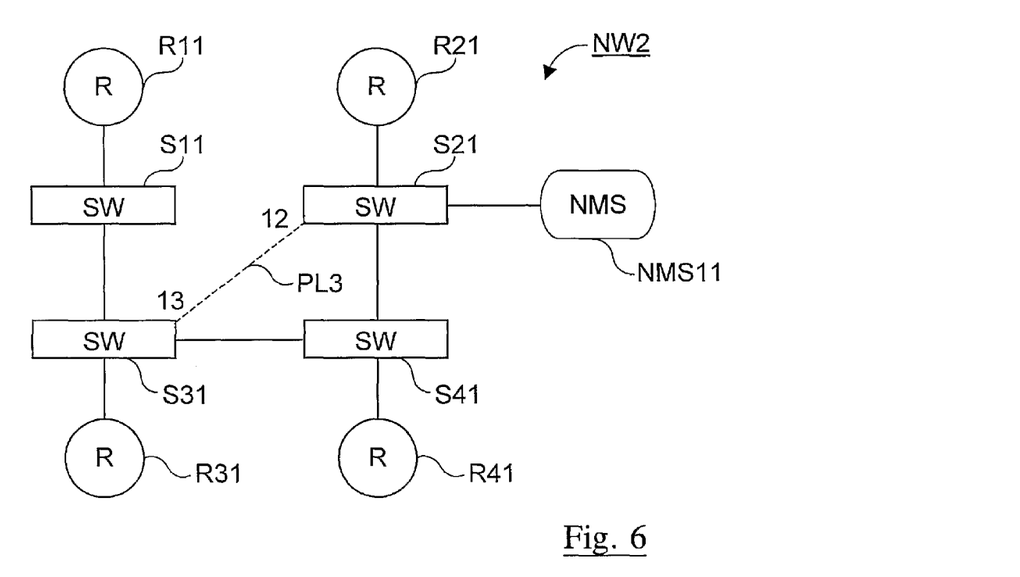
FIG. 6 shows a view over an example network with an added connection.

In connection with FIG. 6 an example will be described which illustrates a link addition case. FIG. 6 depicts a network NW2 with switches S11-S41, routers R11-R41 and a management node NMS11 with the Network Management System NMS. The figure depicts a scenario where the dashed line is a new physical link PL3 between interface 12 of switch S21 and interface 13 of S31. When the NMS11 checks the interface status of switch S21 or S31 it will detect a new connection in the network. The next step is to turn the detected interface down, e.g. the interface 12, and wait for the incoming traps, in order to discover the other peer, interface 13, of this connection. In this case the NMS will get the traps of link down of the switches S21 and S31 thus discovering the new link PL3.

If the node NMS11 gets no traps or only one, it will turn the interface up and then down for three more times. If the situation remains the method will conclude it is not a new connection case, but a new node case and will run the steps described below under the heading of "Adding and removing a node or a network segment".

The removal of a link is a simpler action than adding. This is because the system NMS in the node MS11 does not have to turn interfaces down and up, but just change the interface status to down in its database. Nevertheless, this may result in a failure if, for example, one of the removed links is part of the Data Communication Network DCN. This issue and others related are discussed in details below under the heading of "Robustness and Interoperability".

Adding and Removing a Node or a Network Segment

When the process PTDP can not get the two right corresponding traps during the link addition phase it will conclude that this connection leads to a new node added to the network. This node may be connected just to the already discovered network or may be part of a new network segment. In both cases the process PTDP discovers the new topology.

The first step is to add the interface which leads to this new node to the DCN. Because every new node must follow the assumptions described under the heading of "Requirements and Assumptions", the system NMS is able to access the new node via the DCN. The next step is to run all the initialization process again, but only for the new elements found. The system NMS sends a broadcast ping, gets the new addresses, discovers the spanning tree, configures the DCN to mach the loop free connection, disables the XSTP and discovers the blocked interfaces, exactly as described under the heading of "Initialization time".

In order to detect the removal of a node the system NMS always pings the element before getting the status of the interfaces. If it gets no reply it will try to ping it again for three more times, if still no reply is received then the discovery method will remove the node and all its connection from the topology.

Figure 7:
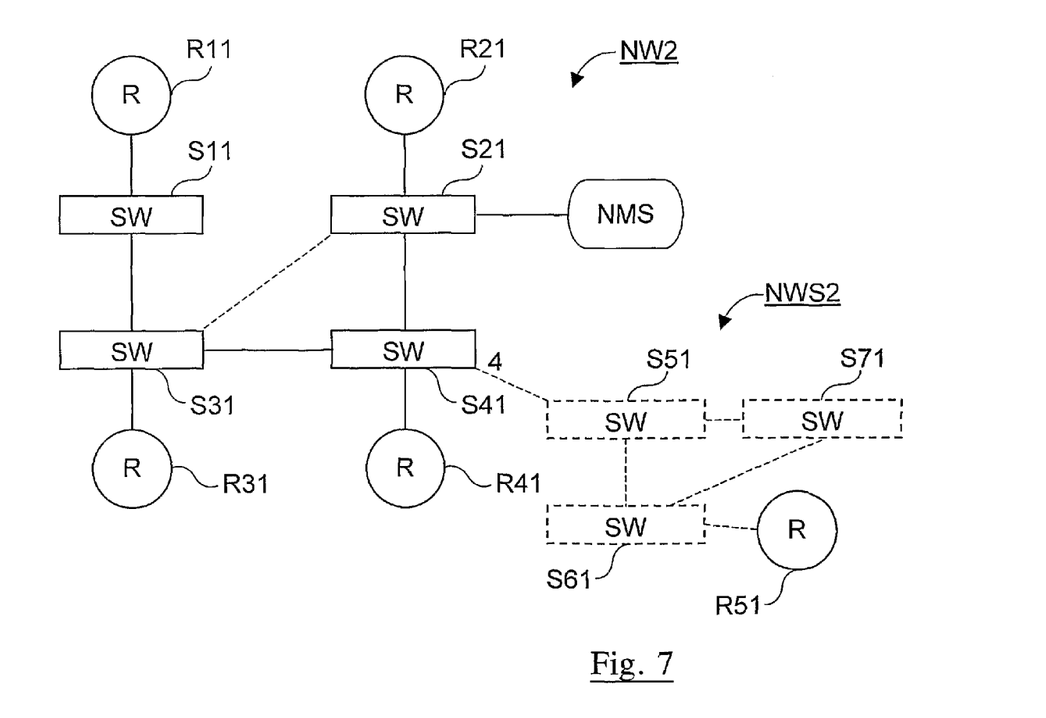
FIG. 7 shows a view over an example network with an added network segment.

FIG. 7 shows a typical scenario of a segment addition. To the network NW2 of FIG. 6 is added a network segment NWS2 which consists of the dashed nodes and links, representing elements to be discovered. The elements are switches S51, S61 and S71, a router R51 and physical links PL4.

Figure 8:
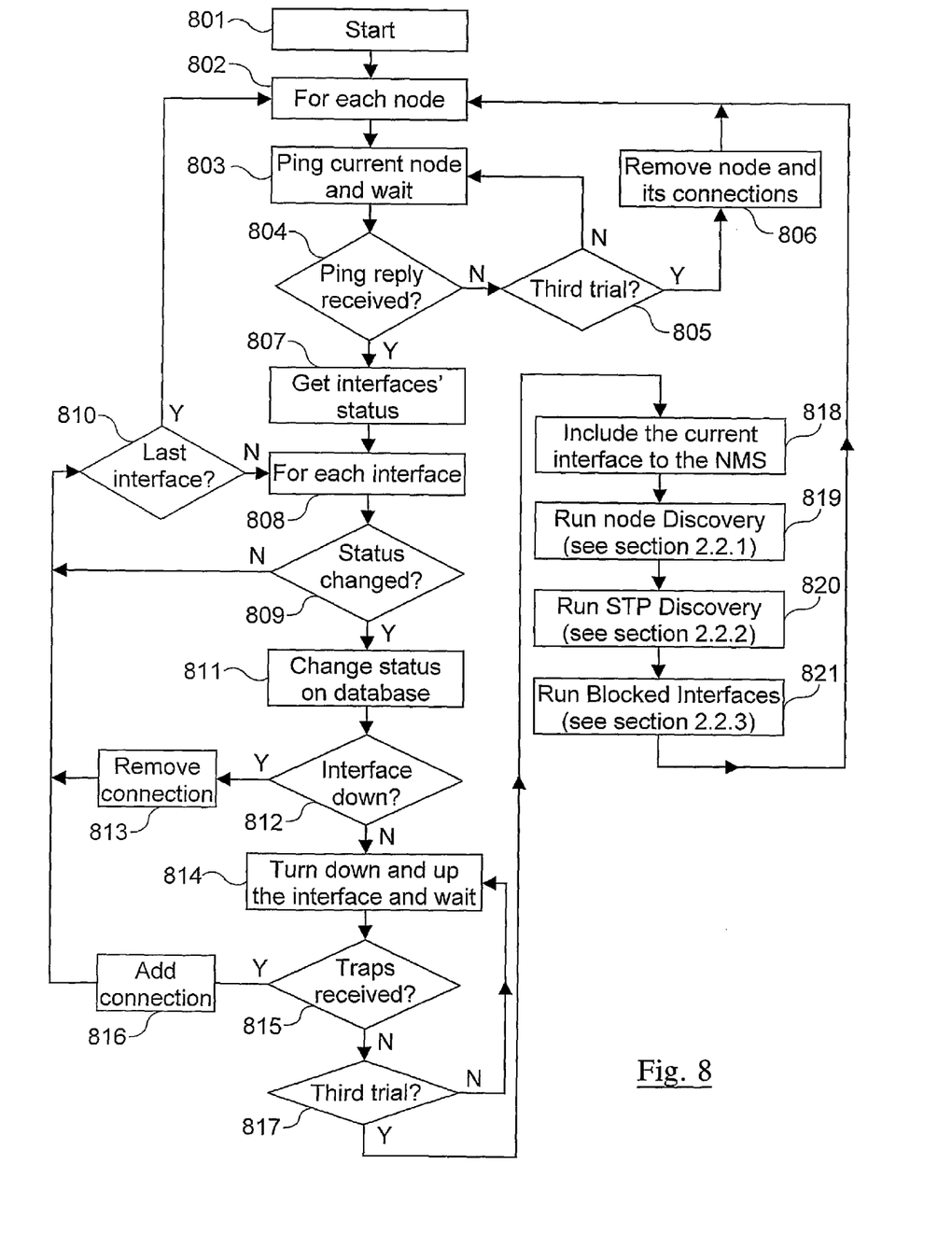
FIG. 8 shows a flowchart over the discovery of topology changes in a network during its operation.

The complete flowchart of the on-the-fly method is depicted in FIG. 8 with reference to the network NW2 in FIG. 6 and the network segment NWS2 in FIG. 7. The method starts in a block 801 and in a block 802 one of the nodes is selected. A ping message is sent to the selected node in a block 803 and in a block 804 it is investigated if a reply is received. In a no alternative N it is investigated in a block 805 if it is the third trial with the previously selected node. In a no alternative N the method goes back to this previously selected node. In a yes alternative Y in block 805 the node and its connection are removed and the method selects another node in block 802. If in block 804 a yes alternative Y is the correct choice the method gets the status of the interface in a block 807. In block 808 is noted that each interface should be included. In a block 809 is investigated if the interface status has changed. In a no alternative N it is investigated in a block 810 whether it is the last interface of the node. In a no alternative N next interface of the node is taken in the block 808 and in a yes alternative next node of the network is taken in block 802. In a yes alternative Y in block 809 the interface status is changed in the database in a block 811. In a block 812 it is investigated if the interface is down. In a yes alternative Y the relevant connection is removed in a block 813 and the method proceeds with block 810 as described. In a no alternative N in block 812 the interface is turned first down and then up in a block 814. After having waited it is investigated in a block 815 whether traps are received. In a yes alternative Y the connection is added in a block 816 and the method takes the step in block 810 as described. In a no alternative N in block 815 it is investigated if it is the third trial with the interface in a block 817. In a no alternative N block 814 is repeated and in a yes alternative Y the current interface is included in a block 818 by the NMS in the node NMS11 in the present embodiment. The network segment NWS2 is then examined like the network NW2. In a block 819 the node discovery is run, in a block 820 the tree discovery is run and in a block 821 the blocked faces discovery is run. The method then proceeds with next node in block 802.

Robustness and Interoperability

Failures might occur during the execution of the mechanism of discovering physical topology, which may prevent it from calculating the complete topology. In the following will be described countermeasures that can be implemented to deal with such failures.

Missing Messages

The process PTDP relies on the exchange of synchronous protocol messages, like the protocol SNMP, to get the information it needs to complete its task. If one of these messages was lost, for instance a "get reply" message, then the process PTDP would block forever waiting for the reply. In other cases, for some unknown reason, the switch in question may not send the trap when an interface goes down, resulting in the same problem—remember that the trap is expected by the process PTDP.

The process PTDP copes with such conditions by means of timers and retries. Basically, every time it waits for replies or traps it starts a timer. When the timer reaches a certain threshold then the process stops waiting and goes to the next step.

In the ping broadcast case of FIG. 3, the process PTDP issues a ping broadcast and waits for the timeout, registering all the arrived replies. This process is repeated for three times, with the process PTDP ignoring the replies that have already been registered.

In the trap reception case of FIG. 5, the process PTDP turns an interface off and on via the protocol SNMP and waits for the traps that should be generated by that interface as well as by the other interface at the other end of the actual link. If timeout is reached and the expected trap has not arrived, the process PTDP repeats this procedure to a maximum of three times. The reason why the trap has not arrived is that it is not generated by the corresponding switch—as it occasionally occurs for some unknown reason—or is discarded along the way. If the process PTDP still fails to receive the expected trap after those attempts then it goes to the next interface. This next interface may be the one at the other end of the link, in which case there is another chance that a previously tried interface generates a trap that is received by PTDP. Therefore, the method is robust.

Even if an interface was not discovered during the initialization phase, it still could be during network operation time when the process PTDP enters in the on-the-fly time loop topology discovery.

Removing Elements

Removal may be a serious problem when the Data Communication Network DCN is composed by the regular links of the network (in-band DCN approach). The removal of a link, for example, may cause a break on the communication among the Network Management System NMS and several other elements. Besides, failure handle protocols, like FHP, will treat this removal like a link failure.

The main focus of the process PTDP is to discover the complete physical topology of a layer two L2 network and the addition of new elements during its operation. Even being capable of removal detection, the right procedure to remove any network element is to schedule it before the execution. First of all the network manager should stop the process PDTP, manually remove the elements on the database in order to match it with the new topology, and then start the process PTDP again. However this time the process PDTP will not run the initialization time, but use the database information to assemble the physical topology. After this the process will keep running the on-the-fly time loop aiming to discover new changes.

Tests

Several physical topologies have been experimentally investigated on a testbed network. Each topology was tested tens of times to stress the process PTDP and to get a higher confidence in the average convergence time of the mechanism. An automated test software has been developed for this purpose.

Figure 9:
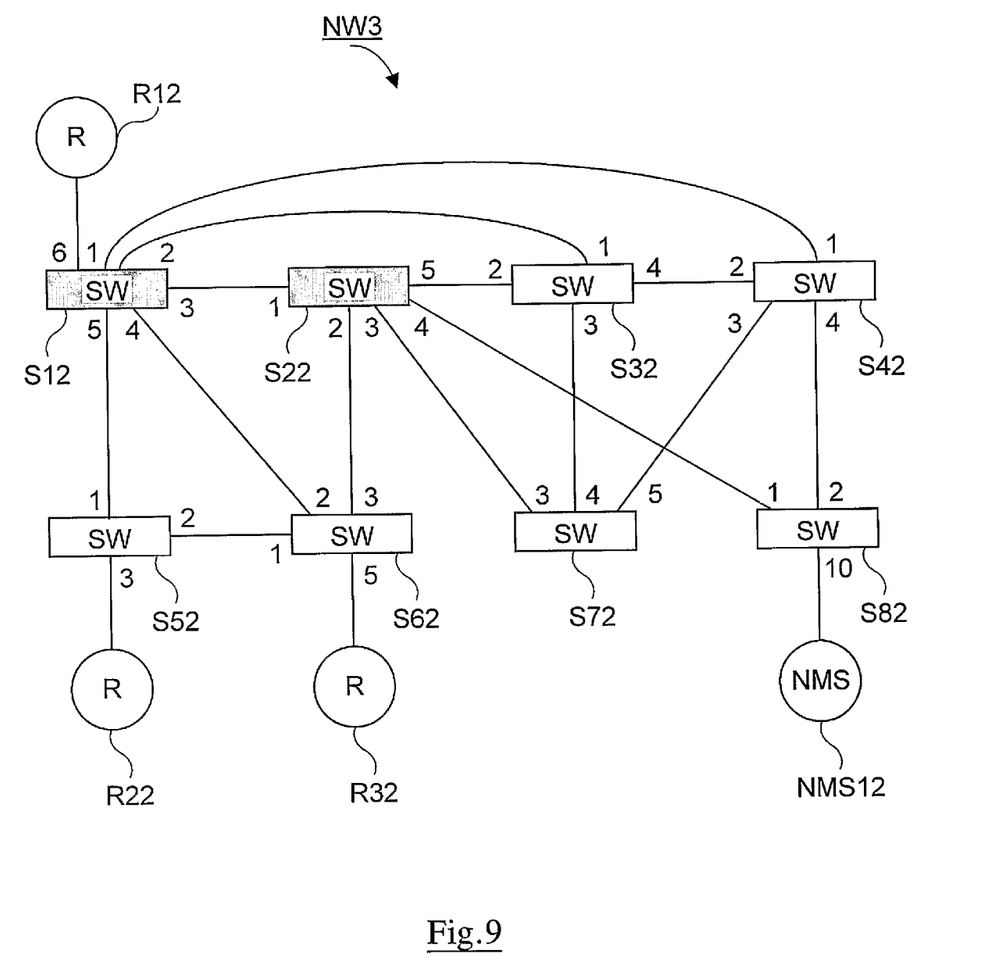
FIG. 9 shows a view over an example network topology that has been tested.

FIG. 9 shows one of the physical topologies, a network NW3, which has been implemented in the testbed. This topology consists of two D-link DES-3526 switches S12, S22 and six Extreme Summit-200 switches S32, S42, S52, S62, S72, S82 plus three Linux Intel-based PC routers R12, R22, R32 and a management node NMS12. This topology contains many loops, which makes it more difficult for the mechanism to determine the physical topology of the network.

The mechanism in the present description successfully passed all the tests, taking in the average approximately 3 minutes to both identify the nodes and determine the physical topology during its initialization time. After the topology discovery was done the method started checking all nodes cyclically in order to get new modifications, once more the mechanism successfully detected the addition and removal of links, nodes and network segments during the normal operation of the network.

Arrangement to Perform the Method

Figure 10:
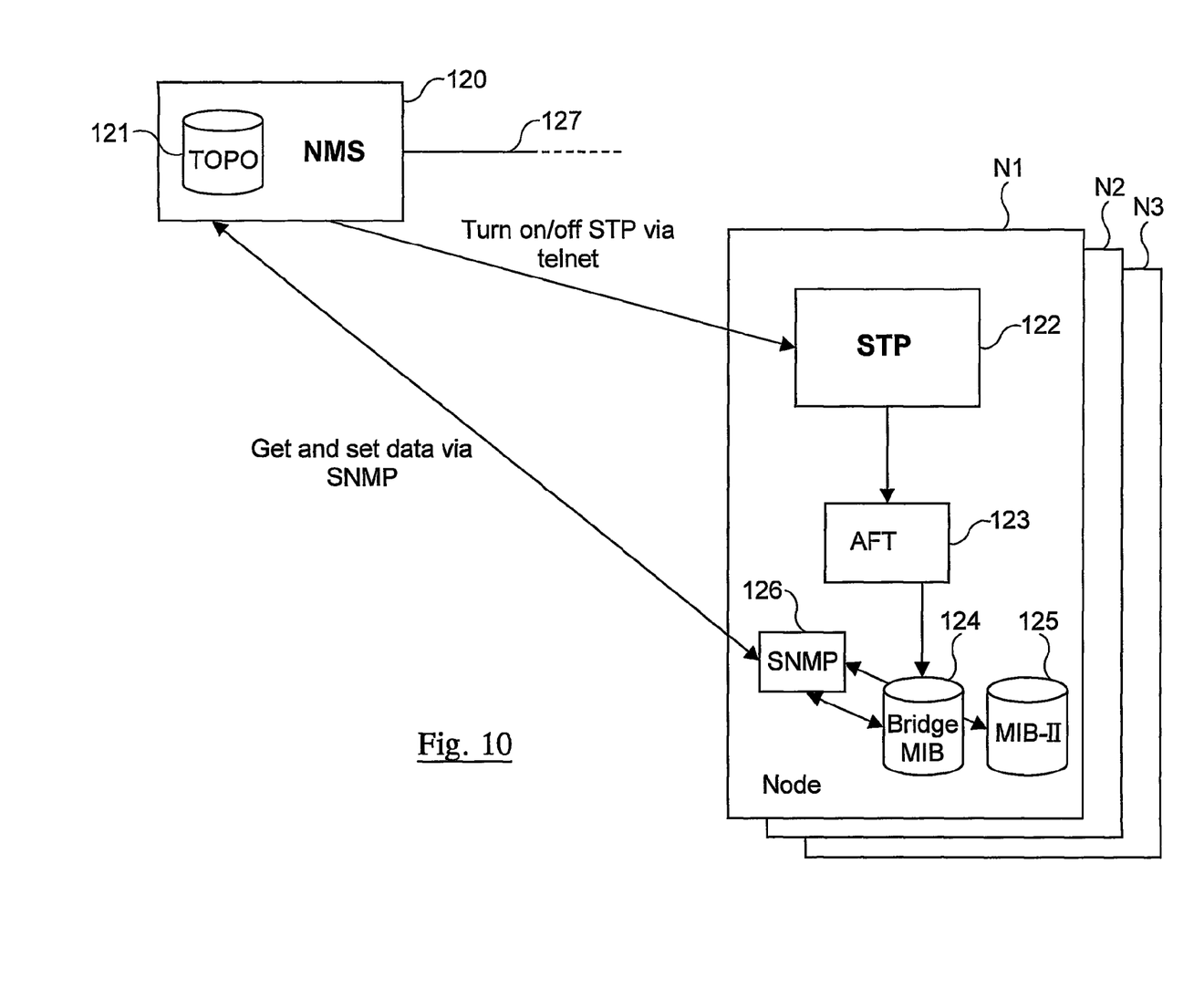
FIG. 10 shows a block schematic over an arrangement to perform the method.

An embodiment of an arrangement to perform the above described method is shown in FIG. 10. The arrangement includes the management node 120 equipped with the Network Management System NMS and a topology server 121. The arrangement also includes nodes N1, N2 and N3 which can be connected to the management node 120. Each of the nodes N1, N2 and N3 has a spanning tree protocol xSTP device 122 connected to an address forwarding table AFT 123, which in turn is connected to a Bridge Management Information Base MIB 124. This is in turn connected to a MIB-II 125 and a Simple Network Management Protocol SNMP device 126. The management node 120 is connected to the xSTP device 122 via telnet and also connected to the SNMP device 126. The xSTP device is used not only to avoid the possible loops in the layer two network but to populate the address forwarding table AFT too. The AFT information is stored in the bridge MIB 124 and is received by the NMS through SNMP "get" commands. The NMS is able to turn on and off the XSTP using telnet commands. A link 127 to a switch in a managed network is also shown.

The invention claimed is:

1. A method of discovering a physical topology of a telecommunication network having a plurality of nodes interconnected by physical links with a management node of a network management system (NMS), wherein the nodes include switches, routers, and bridges, and wherein the nodes have interfaces which utilize the spanning tree protocol to set up a spanning tree topology, the method comprising the steps of:
   configuring the switches, routers, and bridges with an IP address of the management node;
   discovering the nodes in the network by the network management node, the step of discovering the nodes including:
   broadcasting a discovery message from the management node to all nodes of the network;
   receiving by the management node, reply messages from replying nodes; and
   adding each replying node to the network physical topology; and discovering the spanning tree topology of the physical links by the management node, the step of discovering the spanning tree topology including:
    retrieving by the management node, information from Address Forwarding Tables maintained by the switches;
    assigning a ranking value by the management node to each of the switches, wherein a given switch's ranking value depends on how many of the network switches are seen by the given switch; and
    utilizing the ranking values to discover the physical links.

2. The method according to claim 1, wherein the step of assigning the ranking value to the given switch includes:
    determining a total number of nodes in the network seen by the given switch; and
    determining the ranking value of the given switch by excluding from the total number of nodes in the network seen by the given switch, a number of the nodes seen via the interface of the switch that contains the MAC address of the management node.

3. The method according to claim 2, further comprising the steps of:
    determining the ranking value of a first switch;
    identifying a second switch with the next lower ranking value after the ranking value of the first switch;
    determining an interface on the first switch on which the second switch is seen;
    determining an interface on the second switch that leads to the management node; and
    interconnecting the interface on the first switch and the interface on the second switch with a link in the discovered network in the management node.

4. The method according to claim 1, further comprising discovering a blocked interface, the step of discovering the blocked interface including:
    configuring a Virtual Local Area Network (VLAN) to include only the spanning tree topology obtained by the spanning tree protocol;
    disabling the spanning tree protocol;
    determining that the blocked interface is up and not connected to the VLAN;
    turning the blocked interface off and on and noting matching link down traps from each end of a link; and
    connecting the blocked interface to its link peer interface.

5. The method according to claim 4, further comprising discovering changes in the spanning tree topology of the physical links, the step of discovering changes in the spanning tree topology including:
    cyclically seeking the status of the interfaces of the nodes;
    comparing the newly found status with a previous status; and
    adding a discovered link to the network topology.

6. The method according to claim 5 further comprising:
    checking the status of the interfaces of one of the switches; and
    discovering an added link by detecting the matching link peer interface to one of the interfaces of the switch, the detecting being performed by two corresponding link down traps.

7. The method according to claim 5 further comprising:
    checking the status of the interfaces of one of the switches;
    failing to detect two corresponding link down and up traps for a given interface;
    adding the given interface to the network; and
    repeating the topology discovery to discover the structure of a network segment connected via the given interface.

8. An arrangement in a management node of a network management system (NMS) for discovering a physical topology of a telecommunication network, the network having a plurality of nodes interconnected by physical links with the management node, wherein the nodes include switches, routers, and bridges which are configured with an IP address of the management node, and wherein the nodes have interfaces which utilize the spanning tree protocol to set up a spanning tree topology, the arrangement comprising:
    means for discovering the nodes in the network by broadcasting a discovery message from the management node to all nodes of the network, receiving reply messages from replying nodes, and adding each replying node to the network physical topology; and
    means for discovering the spanning tree topology of the physical links by retrieving information from Address Forwarding Tables maintained by the switches, assigning a ranking value to each of the switches, wherein a given switch's ranking value depends on how many of the network switches are seen by the given switch, and utilizing the ranking values to discover the physical links.

9. The arrangement according to claim 8, wherein the management node assigns the ranking value to a given switch by determining a total number of nodes in the network seen by the given switch, and determining the ranking value of the given switch by excluding from the total number of nodes in the network seen by the given switch, a number of the nodes seen via the interface of the switch that contains the MAC address of the management node.

10. The arrangement according to claim 9, further comprising:
    means for determining the ranking value of a first switch;
    means for identifying a second switch with the next lower ranking value after the ranking value of the first switch;
    means for determining an interface on the first switch on which the second switch is seen;
    means for determining an interface on the second switch that leads to the management node; and
    means for interconnecting the interface on the first switch and the interface on the second switch with a link in the discovered network in the management node.

11. The arrangement according to claim 8, further comprising means for discovering blocked interfaces of the nodes, the means for discovering the blocked interfaces including:
    means for configuring a Virtual Local Area Network (VLAN) to include only the spanning tree topology obtained by the spanning tree protocol;
    means for disabling the spanning tree protocol;
    means for determining that a blocked interface is up and not connected to the VLAN;
    means for turning the blocked interface off and on and noting matching link down traps from each end of a link; and
    means for connecting the blocked interface to its link peer interface.

12. The arrangement according to claim 8, further comprising means for discovering changes in the tree topology of the physical links by cyclically seeking the status of the interfaces of the nodes, comparing the newly found status with a previous status, and adding a discovered link to the network topology.

13. The arrangement according to claim 12 wherein the means for discovering changes in the tree topology of the physical links includes:
    means for checking the status of the interfaces of one of the switches; and means for discovering an added link by detecting the matching link peer interface to one of the interfaces of the switch, the detecting being performed by two corresponding link down traps.

14. The arrangement according to claim 12 wherein the means for discovering changes in the tree topology of the physical links includes:
   means for checking the status of the interfaces of one of the switches; and
   means for adding the given interface to the network upon failing to detect two corresponding link down and up traps for a given interface;
   wherein the topology discovery is repeated to discover the structure of a network segment connected via the given interface.

* * * * *

UNITED STATES PATENT AND TRADEMARK OFFICE
CERTIFICATE OF CORRECTION

PATENT NO.      : 8,014,320 B2
APPLICATION NO. : 12/519792
DATED           : September 6, 2011
INVENTOR(S)     : Farkas et al.

Page 1 of 1

It is certified that error appears in the above-identified patent and that said Letters Patent is hereby corrected as shown below:

In Column 2, Line 52, delete "XSTP," and insert -- xSTP, --, therefor.

In Column 4, Line 10, delete "XSTP" and insert -- xSTP --, therefor.

In Column 4, Line 13, delete "XSTP." and insert -- xSTP. --, therefor.

In Column 4, Line 53, delete "XSTP" and insert -- xSTP --, therefor.

In Column 5, Line 1, delete "XSTP" and insert -- xSTP --, therefor.

In Column 5, Line 59, delete "XSTP" and insert -- xSTP --, therefor.

In Column 7, Line 63, delete "XSTP" and insert -- xSTP --, therefor.

In Column 7, Line 64, delete "XSTP" and insert -- xSTP --, therefor.

In Column 8, Line 26, delete "protocpl" and insert -- protocol --, therefor.

In Column 8, Line 26, delete "XSTP" and insert -- xSTP --, therefor.

In Column 8, Line 34, delete "XSTP." and insert -- xSTP. --, therefor.

In Column 9, Line 66, delete "MS11" and insert -- NMS11 --, therefor.

In Column 10, Line 21, delete "XSTP" and insert -- xSTP --, therefor.

In Column 11, Line 64, delete "PDTP," and insert -- PTDP, --, therefor.

In Column 11, Line 66, delete "PDTP" and insert -- PTDP --, therefor.

In Column 12, Line 47, delete "XSTP" and insert -- xSTP --, therefor.

Signed and Sealed this
Third Day of January, 2012

David J. Kappos
*Director of the United States Patent and Trademark Office*